No. 802,667. PATENTED OCT. 24, 1905.
C. C. STUART.
HORIZONTAL BAND SAW.
APPLICATION FILED JAN. 22, 1903.

4 SHEETS—SHEET 1.

Witnesses.
P. A. Dillman
W. Roe.

Inventor.
Charles C. Stuart.
By R. C. Wright
atty.

No. 802,667. PATENTED OCT. 24, 1905.
C. C. STUART.
HORIZONTAL BAND SAW.
APPLICATION FILED JAN. 22, 1903.

4 SHEETS—SHEET 2.

Witnesses.
F. A. Dillman
W. Roe.

Inventor.
Charles C. Stuart.
By R. C. Wright
atty.

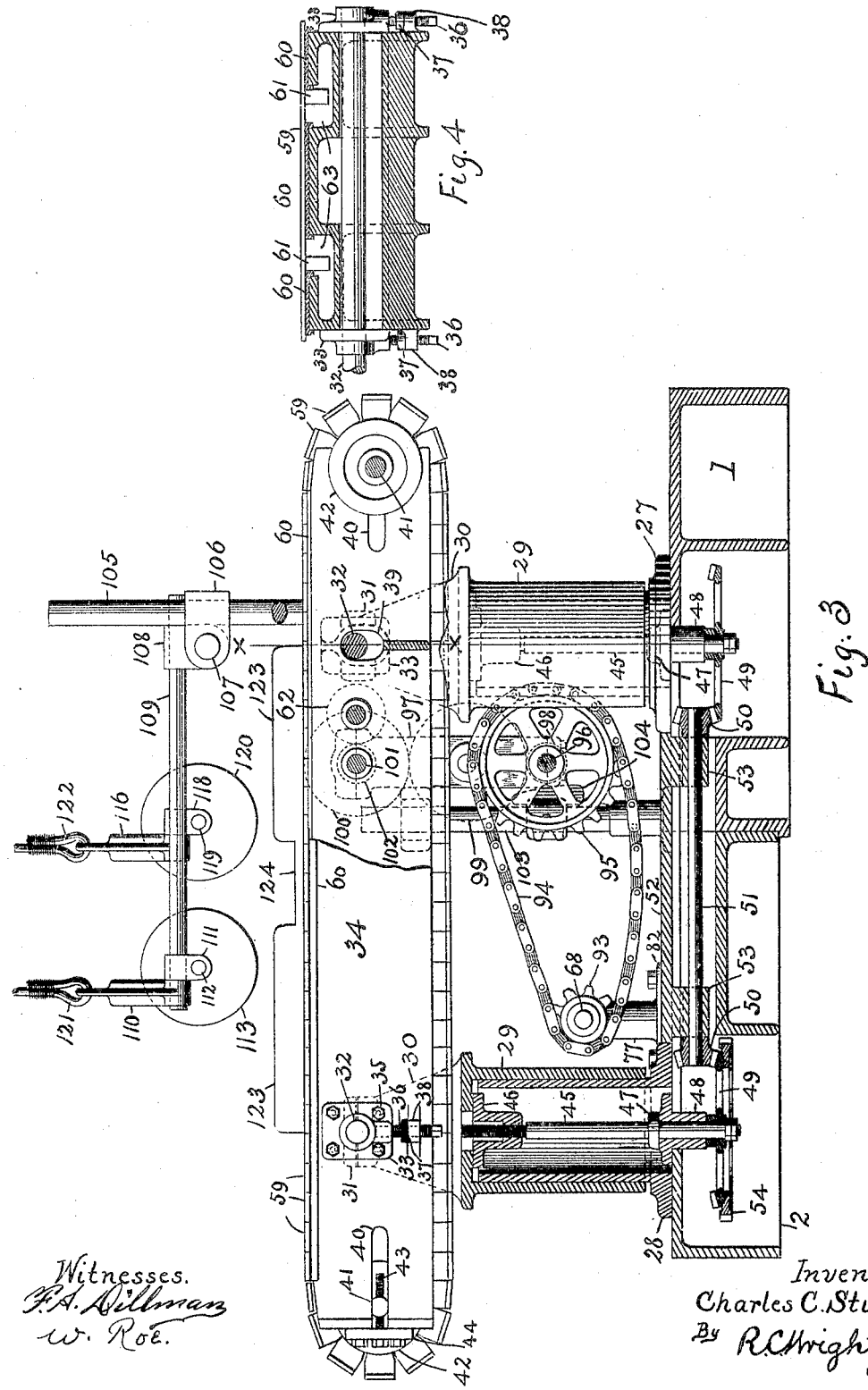

No. 802,667. PATENTED OCT. 24, 1905.
C. C. STUART.
HORIZONTAL BAND SAW.
APPLICATION FILED JAN. 22, 1903.

4 SHEETS—SHEET 4.

Witnesses.
F. A. Hillman
W. Roe.

Inventor.
Charles C. Stuart
By R. C. Wright
atty.

UNITED STATES PATENT OFFICE.

CHARLES C. STUART, OF CAMPVILLE, CONNECTICUT.

HORIZONTAL BAND-SAW.

No. 802,667.　　　　Specification of Letters Patent.　　　　Patented Oct. 24, 1905.

Application filed January 22, 1903. Serial No. 140,186.

*To all whom it may concern:*

Be it known that I, CHARLES C. STUART, a citizen of the United States, residing at Campville, in the county of Litchfield and State of Connecticut, have invented certain new and useful Improvements in Horizontal Band-Saws, of which the following is a specification.

This invention contemplates certain new and useful improvements in sawing-machines, and relates particularly to that type employing horizontal band-saws. Heretofore in machines of this type the material to be operated upon has been fed from a fixed bench or table in which are mounted feed-rolls coacting with guide-rolls, whereby the stock is moved into contact with the saw. These feed-rolls are necessarily raised slightly above the table in order to carry the burden of the stock and deliver the latter to the action of the saw without being stalled by an excess of friction between the table and the moving stock. As a result of the excess of elevation of the feed-rolls an undulatory movement is imparted to the stock in its ascent and descent over the apex of the feed-rolls in its passage to the saw, whereby the resulting cut of the latter is correspondingly uneven. When again the same piece of stock is passed over the feed-rolls, these defects are repeated in an increased degree, the lumber thus produced being exceedingly crooked and uneven.

My invention has for its object to overcome the foregoing defects by providing a sawing-machine with an improved feeding device whereby the stock is presented to the saw with a uniform and unvarying movement, whereupon the resultant lumber is formed with smooth, uniform, and parallel surfaces regardless of the number of cuts from a single piece of timber.

A further object is to provide means for operating the feeding device and regulating the speed at which the stock is fed to the saw; and a further object is to provide means whereby said feeding device may be adjusted to regulate the thickness of the lumber to be cut.

The invention will be hereinafter fully set forth, and particularly pointed out in the claims.

Figure 1:
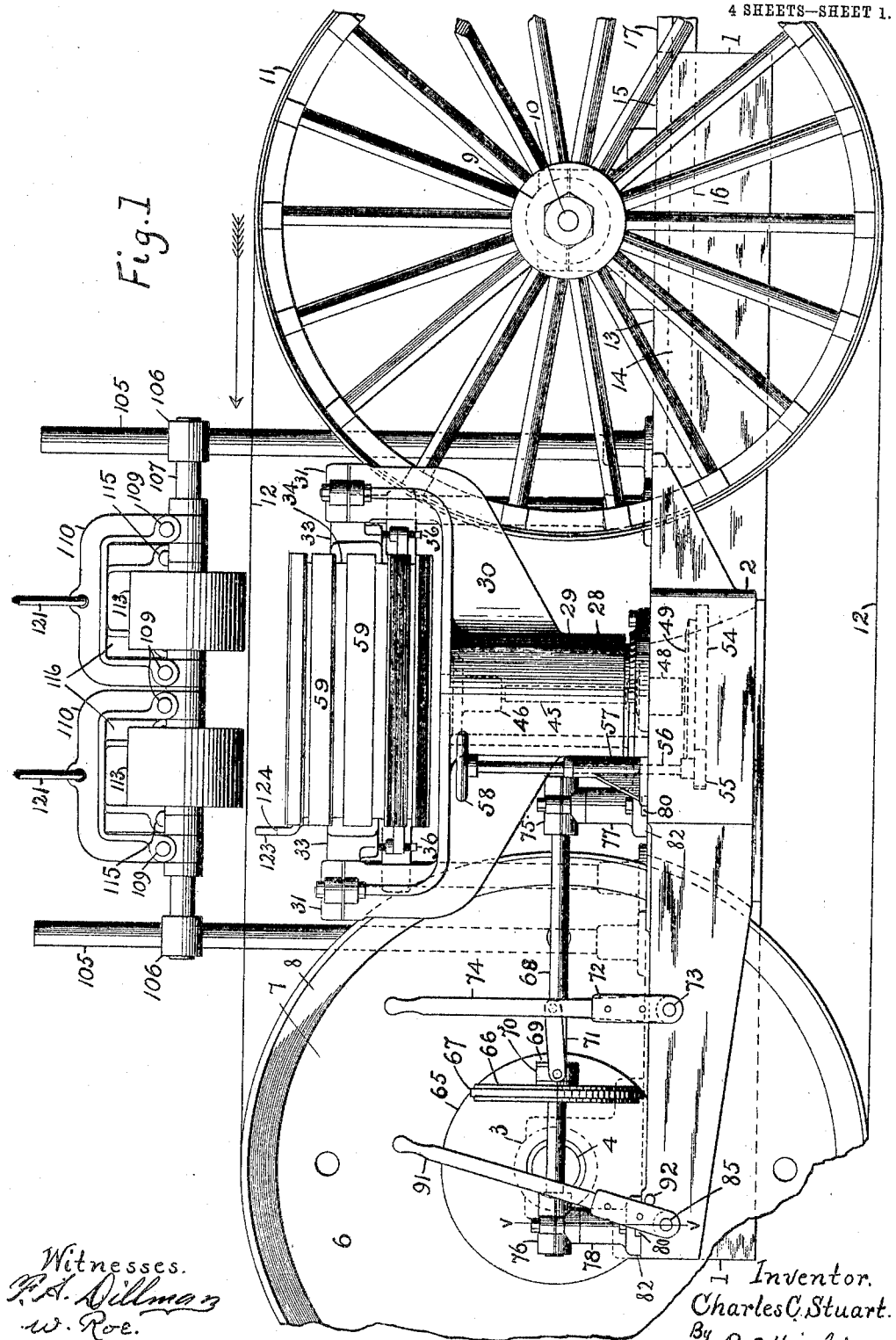
Figure 2:
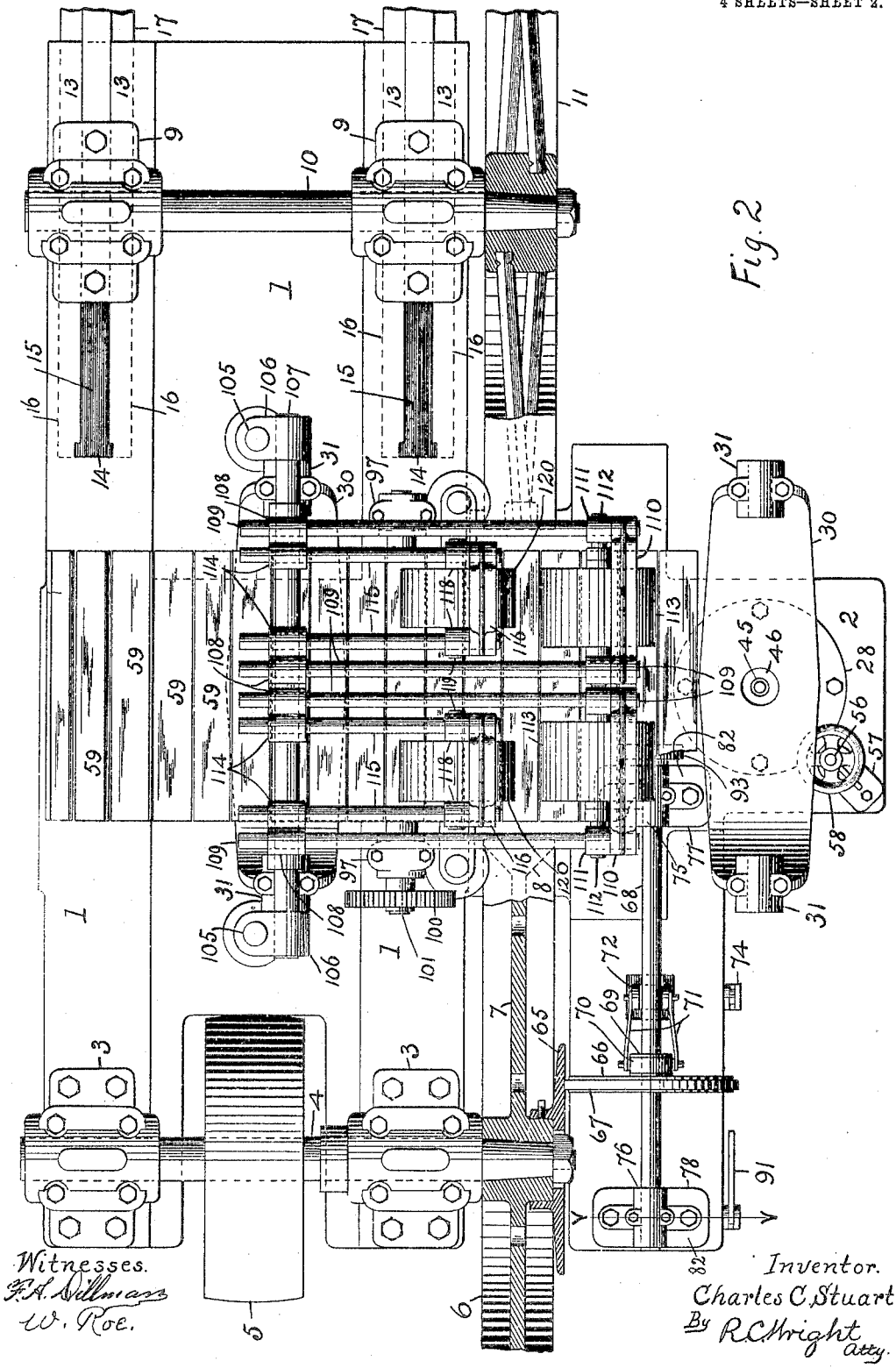
Figures 5, 6:
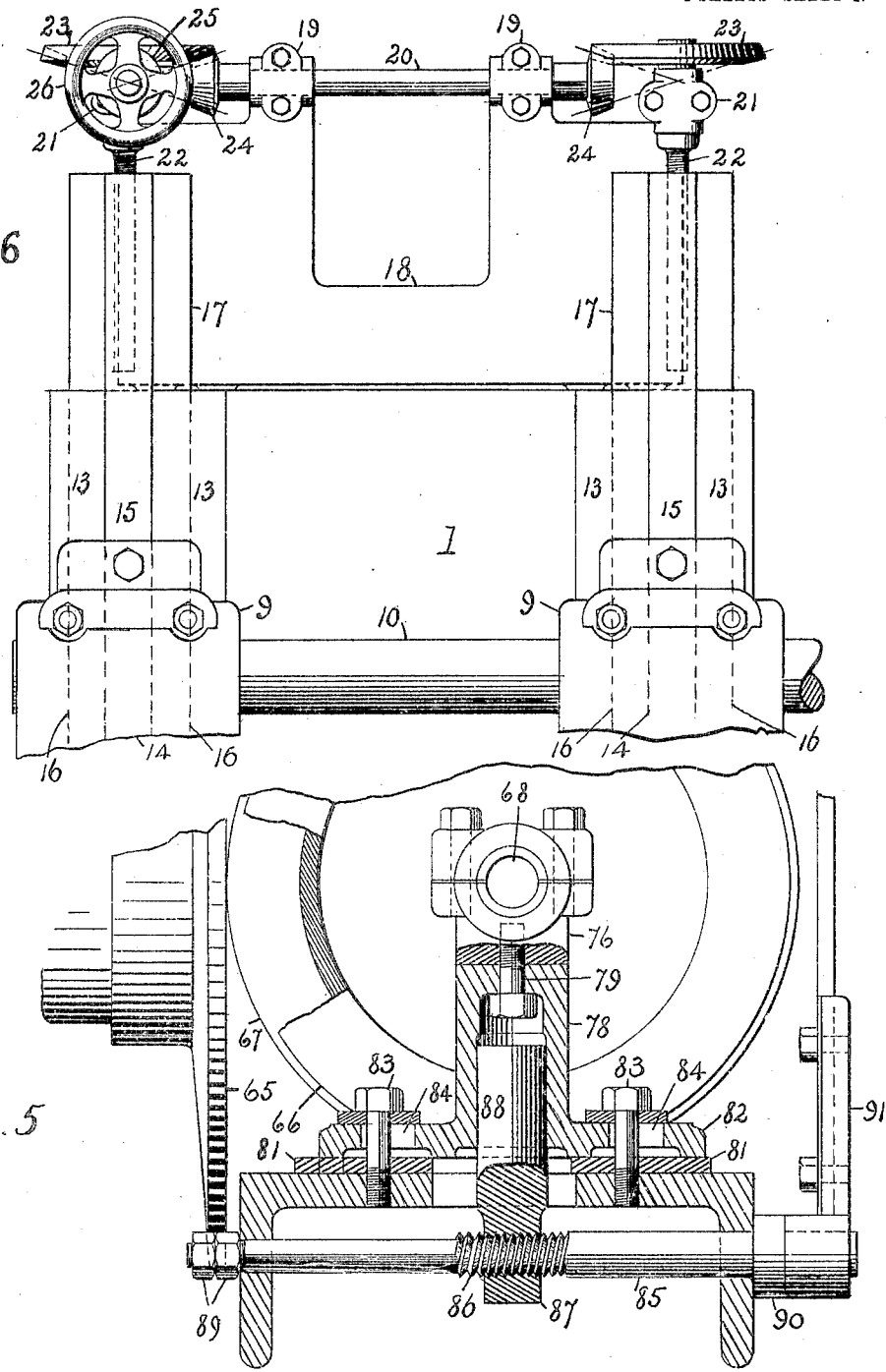

In the accompanying drawings, Figure 1 is a front elevation illustrating my invention. Fig. 2 is a plan view thereof, showing parts in section. Fig. 3 is an end view with parts broken away and other parts shown in section. Fig. 4 is a transverse sectional view of the feed-table on line $x\ x$, Fig. 3. Fig. 5 is a detail view of the speed-regulating device. Fig. 6 is a detail view of the device for regulating the tension of the saw.

Referring to the drawings, 1 designates a bed-plate provided at one end with bearings 3 for a drive-shaft 4, which is rotated by a band-wheel 5, receiving power from any suitable source. (Not shown.) The drive-wheel 6 is mounted upon one end of shaft 4, said drive-wheel being formed with a central web 7 to increase the weight thereof, whereby said wheel serves the purpose of a balance or fly wheel. The rim 8 of said wheel is provided with a triangular peripheral depression to receive the saw 12, said saw being also passed around a second drive-wheel 11, mounted upon a shaft 10, supported in bearings 9 at the opposite end of bed-plate 1. The bearings 9 are secured to slides 17, which are arranged to reciprocate in slots 15, formed in the bed-plate, said slots being provided with lateral extensions 16, whereby seats 13 are formed for the bearings 9. In order to provide for the simultaneous adjustment of slides 17, a bracket 18 is secured to the end of bed-plate 1, said bracket being provided with bearings 19 for a rotatable shaft 20, provided at each end with a bevel-gear 24. The gears 24 mesh with corresponding bevel-gears 23, keyed to the threaded shafts 22, mounted in bearings 21 and working in threaded recesses in slides 17. A hand-wheel 26 is also mounted in bracket 18 and provided with a beveled pinion 25, meshing with one of the pinions 23, whereby shaft 20 is rotated and shafts 22 simultaneously operated to regulate the tension of the saw or to adjust the wheel 11 to saws of different lengths.

Upon bed-plate 1, intermediate of wheels 6 and 11 and to one side of the path of the saw, is mounted a column 27, a similar column 28 (shown in section, Fig. 3) being supported at the opposite side of the path of the saw upon a supplemental bed-plate 2, secured to bed-plate 1. Each of said columns is provided with a telescoping sleeve 29, supporting brackets 30, provided with bearings 31 for shafts 32, the latter being extended through slots 39 formed in the frame 34 of the feed mechanism. The side of frame 34 has been broken away at the right-hand end in Fig. 3 for the purpose of illustrating slot 39 and its relation with shaft 32. Said frame is also provided with bearing-blocks 33, arranged to receive shafts 32, said blocks being secured to the exterior of frame 34 by means of bolts 35, working in suitable slots in said blocks. Vertical screws 36 are tapped into blocks 33, said screws being provided with collars 37, bearing upon lugs 38, formed on frame 34, whereby said frame may be adjusted to a true level position or in line with the saw, slots 39 permitting frame 34 to move up or down over shafts 32. Sleeves 29 are elevated by means of screw-shafts 45, working in collars 46, carried by said sleeves, said shafts being supported by means of bearing-collars 47, resting on sleeves 48. The lower end of each shaft 45 is provided with a beveled pinion 49, meshing with corresponding pinions 50 on the opposite ends of a shaft 51, mounted in bearings 53 of a frame 52, carried by bed-plate 1. A spur-gear 54 is formed with one of the pinions 49, the same meshing with a pinion 55 formed on a shaft 56, mounted in suitable bearings 57 and provided with a hand-wheel 58. By this arrangement the sleeves 29 are simultaneously adjusted.

At each end of frame 34 are formed slots 40, adapted to receive and support flattened portions of shafts 41, upon which the channeled guide-wheels 42 for the table are mounted. Said shafts are adjusted within said slots by means of screws 43, passed therethrough, their heads bearing against plates 44, secured to the ends of said frame. In this manner the wheels 42 are adjusted to maintain a uniform tension upon the endless table or feeder. The latter is composed of a plurality of plates 59 of a length equal to the width of frame 34 and resting upon wear-plates 60, secured to said frame. Each plate 59 is provided near its ends with depending portions, forming toothed racks or sections 61, the teeth of which are engaged by gears 62. Said toothed racks or sections work in the channels of wheels 42 and also in slots 63 of frame 34, their outer faces bearing against angular extensions 60' of the wear-plates 60. The plates 59 are united by any suitable means permitting of their articulated relation. The table is also held from lateral displacement by the racks 61, working in the slots of frame 34. Thus an absolutely smooth and uniform feed is assured, which is of decided advantage, as a band-saw is exceedingly flexible and liable to yield. A uniform feed is therefore very essential to avoid liability of flexing the saw.

Upon the hub of driving-wheel 6 is secured a friction disk or gear 65, against which is arranged to bear a friction-wheel 66, provided with a removable periphery 67 of a material adapted to give the requisite frictional adhesion. Said wheel 66 is keyed to a shaft 68, but free to slide thereon, said wheel being provided with a hub 69, to which a yoke 70 is secured. Said yoke is connected by links 71 with a forked lever 72, mounted upon a rock-shaft 73, journaled in bed-plate 1, said rock-shaft having its outer end provided with an operating-lever 74, whereby wheel 66 may be moved across the face of disk 65 to vary the speed of rotation of shaft 68. The latter shaft is journaled in swiveled bearings 75 76, secured to standards 77 78 by means of bolts 79. Said standards are arranged to be moved toward or from disk 65, their bases 82 being guided by blocks 80 81, said bases being held in position by bolts 83, passed through slots 84, formed therein and engaging the bed-plate. Fitting within standard 78 is an extension 88 of a nut 87, the latter being mounted upon the threaded portion 86 of a shaft 85, the threads of said shaft being of such pitch as to effect a rapid movement of said nut. Said shaft is held from endwise displacement by means of nuts 89, secured on one end thereof, the opposite end being provided with a collar 90. An operating-lever 91 is keyed on one end of said shaft, the movement of which is limited by stop 92. Keyed on shaft 68 is a sprocket-wheel 93, connected by a chain 94 with a second sprocket 95, secured upon a shaft 96, journaled in bearings 97, depending from frame 34. Mounted upon shaft 96 and rotating therewith is a pinion 98, meshing with an idler 99, which in turn meshes with a pinion 100, keyed to shaft 101. The latter is provided with a pinion 102, meshing with pinion 62, whereby said latter pinions are rotated and motion is imparted to the feed-table, as heretofore described. Adjustably secured upon columns 103, located at each side of frame 34, are trammels 104, having their faces curved to a radius from the center of shaft 68. The depending bearings 97 are designed to bear against these curved faces, whereby a constant distance is maintained between shafts 68 and 96 irrespective of the elevation of frame 34.

Located on each side of frame 34 and at the approximate center of bed-plate 1 are posts or columns 105, upon which are adjustably secured hubs 106, supporting a cross-rod 107. Upon said shaft are secured two pairs of cross-hubs 108, arranged to support two pairs of rods 109, disposed longitudinally of the frame 34 and extending beyond the path of the saw. Each pair of rods 109 enters a yoke 110, and adjacent each yoke are secured hubs 111, which serve to support the shafts 112 of rollers 113. Intermediate of each pair of hubs 108 the rod 107 is provided with additional hubs 114, also arranged in pairs and serving to support rods 115 parallel to rods 109, but terminating short of the path of the saw. These rods also serve to support yokes 116 and the hubs 118 for the shafts 119 of rollers 120. The rollers 113 and 120 are thus independently supported and can be readily raised or lowered and by means of counterweights, (not shown,) connected to the yokes by means of ropes 121 122, can be regulated to give any desired pressure. They will also automatically adjust themselves to an uneven surface. A stop 123 is secured to frame 34 and is provided with a gap 124 to allow the saw free passage, and against this stop the stock abuts to resist the thrust of said saw.

The advantages of my improved sawing-machine will be readily apparent to those skilled in the art to which it appertains. It will be particularly observed that I have provided simple and efficient means whereby the stock is fed to the saw with a uniform, smooth, and unvarying movement, said stock resting by gravity upon the feed-table and being evenly supported at all points while under the action of the saw. It will also be noted that my improved feeding device is so arranged that the speed of the feed may be readily and quickly varied to suit varying conditions and qualities of material. It will be further observed that the feeding-table may be adjusted relative to the saw to regulate the thickness of the lumber to be produced and that means are provided for maintaining said feed-table in a true horizontal position, thereby insuring accuracy in the cut of the saw. It will be further noted that I have provided means whereby the operation of the feed-table may be stopped independently of the operation of the saw.

I claim as my invention—

1. An improvement in sawing-machines comprising an endless feed-table, means for raising and lowering the same with relation to the saw, and means for adjusting said table relative to the saw independently of said former means.

2. An improvement in sawing-machines comprising a frame, an endless feed-table carried thereby, means for raising and lowering said frame with relation to the saw, and means for adjusting said frame relative to the saw independently of said former means.

3. An improvement in sawing-machines comprising a frame, an endless feed-table carried thereby, means for raising and lowering said table with relation to the saw, and means for independently adjusting each end of said table.

4. An improvement in sawing-machines comprising an endless feed-table, supports therefor, means for raising and lowering said supports, and means for adjustably mounting said table in said supports.

5. An improvement in sawing-machines, comprising supports, a frame mounted thereon and carrying an endless feed-table, means for adjusting said frame in said supports, and means for raising and lowering said supports.

6. An improvement in sawing-machines, comprising supporting-brackets, shafts mounted therein, a frame supported by said shafts and carrying an endless feed-table, and means for adjusting the relative height of said shafts.

7. An improvement in sawing-machines, comprising supporting-brackets, shafts mounted therein, a frame, adjustable blocks carried thereby and constructed to receive the ends of said shafts, and an endless feed-table carried by said frame.

8. An improvement in sawing-machines, comprising supporting-brackets, shafts mounted therein, a frame, adjustable blocks carried thereby and constructed to receive the ends of said shafts, adjusting-screws for said blocks, and an endless feed-table carried by said frame.

9. An improvement in sawing-machines, comprising telescoping supports carrying brackets, shafts mounted in said brackets, a frame adjustably mounted on said shafts and carrying an endless feed-table, and means for expanding or contracting said telescoping supports, whereby said frame is raised or lowered.

In testimony whereof I affix my signature in presence of two witnesses.

CHARLES C. STUART.

Witnesses:
RANSOM C. WRIGHT,
WILLIAM C. STOEVER.